United States Patent
Sato et al.

(10) Patent No.: US 9,052,841 B2
(45) Date of Patent: Jun. 9, 2015

(54) ELECTRONIC DEVICE AND DATA TRANSFER METHOD

(71) Applicants: Jun Sato, Kokubunji (JP); Keiko Watanabe, Fuchu (JP)

(72) Inventors: Jun Sato, Kokubunji (JP); Keiko Watanabe, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 116 days.

(21) Appl. No.: 13/708,250

(22) Filed: Dec. 7, 2012

(65) Prior Publication Data

US 2013/0326142 A1 Dec. 5, 2013

(30) Foreign Application Priority Data

May 31, 2012 (JP) .................................. 2012-125133

(51) Int. Cl.
   *G06F 3/06* (2006.01)
   *G06F 13/38* (2006.01)
   *G06K 19/077* (2006.01)

(52) U.S. Cl.
   CPC .............. *G06F 3/0679* (2013.01); *G06F 3/061* (2013.01); *G06F 3/0656* (2013.01); *G06F 13/38* (2013.01); *G06K 19/077* (2013.01)

(58) Field of Classification Search
   CPC ..... G06F 12/023; G06F 17/30; G06F 3/0679; G06F 3/061; G06F 3/0656; G06F 13/38; G06K 19/077
   USPC ........................................................ 711/115
   See application file for complete search history.

(56) References Cited

U.S. PATENT DOCUMENTS

| | | | | |
|---|---|---|---|---|
| 5,293,236 | A * | 3/1994 | Adachi et al. | 348/231.2 |
| 6,574,294 | B1 * | 6/2003 | Lynch et al. | 375/354 |
| 6,659,343 | B2 * | 12/2003 | Tanaka | 235/380 |
| 7,539,709 | B1 * | 5/2009 | Vengerov et al. | 1/1 |
| 7,706,406 | B2 * | 4/2010 | Jang | 370/469 |
| 2003/0120871 | A1 * | 6/2003 | Ayaki et al. | 711/137 |
| 2007/0025250 | A1 | 2/2007 | Shimonishi et al. | |

FOREIGN PATENT DOCUMENTS

| | | |
|---|---|---|
| JP | H 0573485 | 3/1993 |
| JP | H 09258907 | 10/1997 |
| JP | 2002026968 | 1/2002 |
| JP | 2010-200005 | 9/2010 |
| JP | 2011-116083 | 6/2011 |
| WO | 2005-020524 A1 | 3/2005 |

* cited by examiner

*Primary Examiner* — Farley Abad
(74) *Attorney, Agent, or Firm* — Blakely Sokoloff Taylor & Zafman LLP

(57) ABSTRACT

According to one embodiment, an electronic device including, a communication module configured to transfer data, a controller configured to transmit data to the second electronic device through the communication module, and configured to temporarily hold the data in a receiving buffer of the second electronic device, and a data controller configured to receive free space information of the receiving buffer of the second electronic device from the second electronic device through the communication module, and configured to prepare data, which is transmitted to each mobile medium from the communication module through the second electronic device, based on the received free space information.

8 Claims, 6 Drawing Sheets

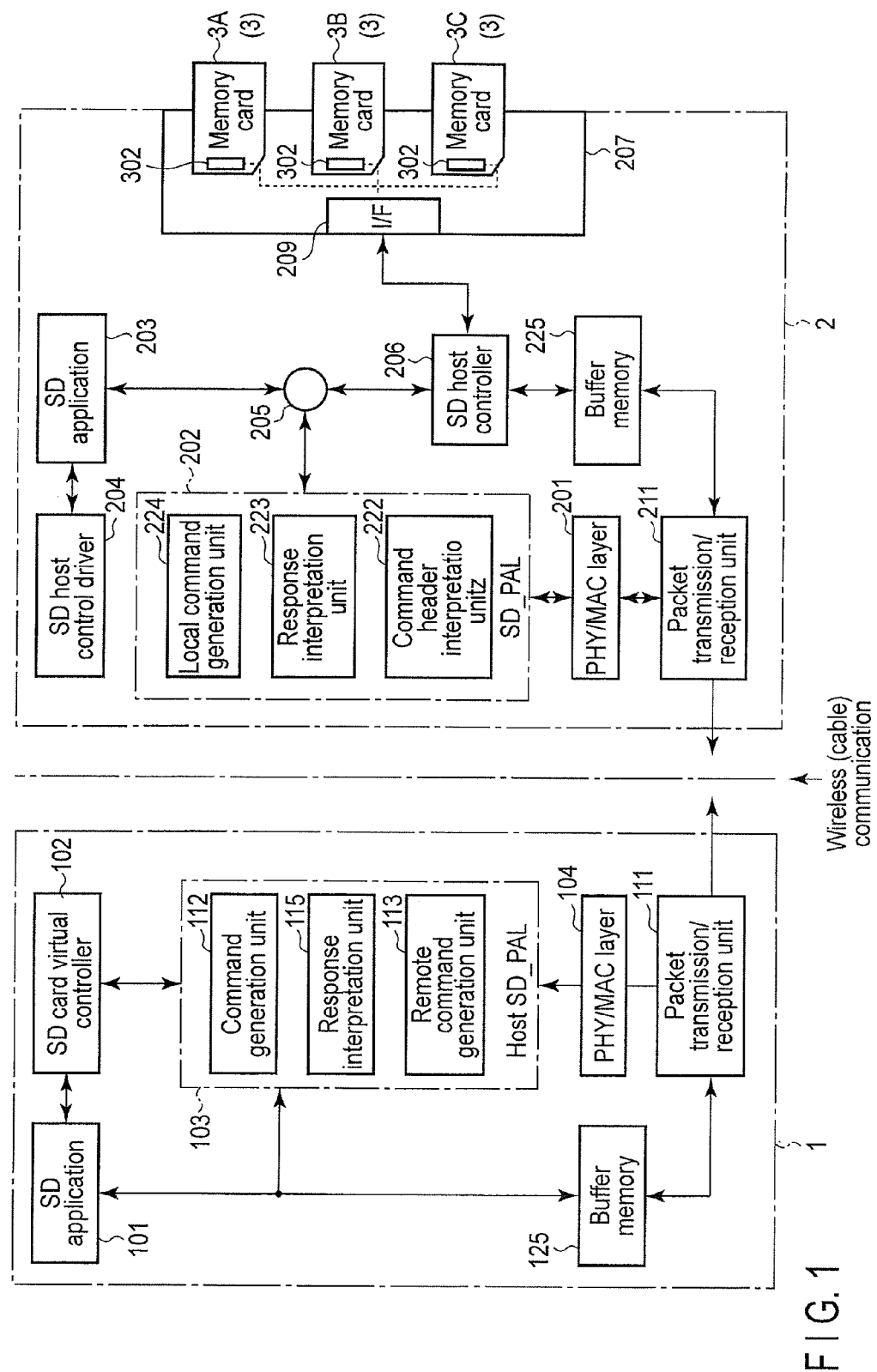
F I G. 1

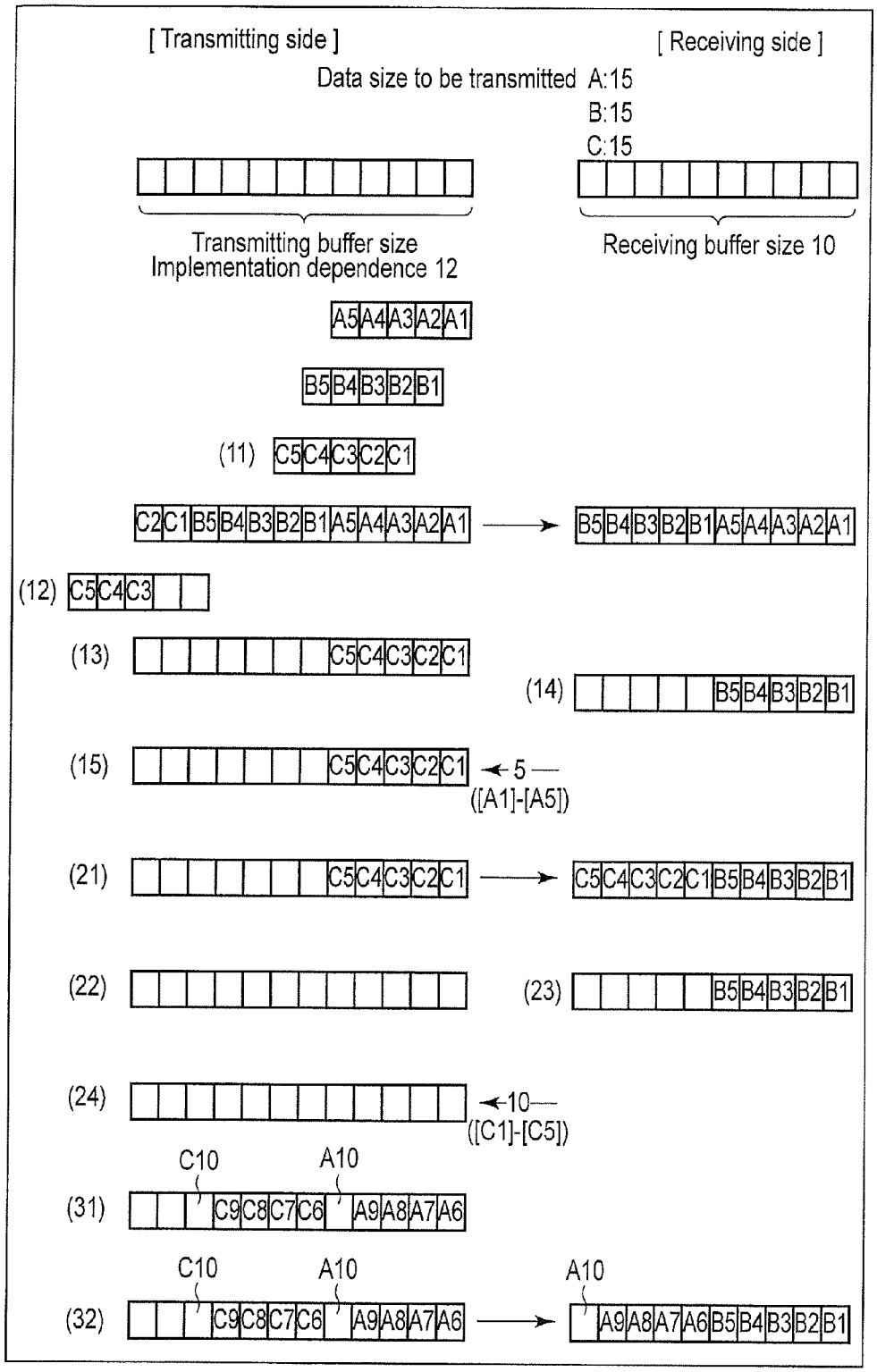
F I G. 4A

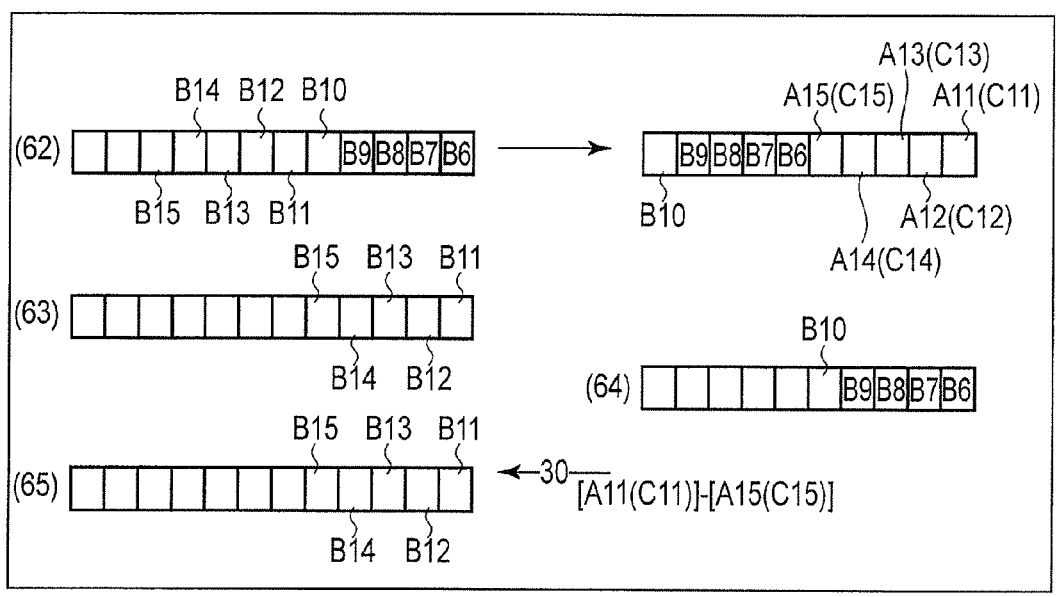
F I G. 4C

ELECTRONIC DEVICE AND DATA TRANSFER METHOD

CROSS-REFERENCE TO RELATED APPLICATIONS

This application is based upon and claims the benefit of priority from Japanese Patent Application No. 2012-125133, filed May 31, 2012, the entire contents of which are incorporated herein by reference.

FIELD

Embodiments described herein relate generally to a data transfer method with respect to a memory apparatus via another electronic device and to an electronic device which realizes this method.

BACKGROUND

There has been already widely used a host apparatus (an electronic device) which writes data (information) or reads out data from a memory apparatus based on wireless communication or cable communication between itself and the memory apparatus that can be taken out from a portable device, e.g., a device (another electronic device) into/from which data can be recorded/read.

Nowadays, delivers (transfers) data between at least two of storage devices in a same time or parallel with are required.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary diagram showing an example of a mutual relationship between an electronic device to which an embodiment is applied, a memory apparatus (a portable device), and an apparatus (another electronic device) in which recording and reading are possible, according to an embodiment;

FIG. 4A is an exemplary diagram showing an example of data transfer between the transmitting side device and the receiving side device in the electronic device to which the embodiment is applied, the memory apparatus, and another electronic device, according to an embodiment;

FIG. 4C is exemplary diagram showing an example of data transfer between the transmitting side device and the receiving side device in the electronic device to which the embodiment is applied, the memory apparatus, and another electronic device, according to an embodiment.

DETAILED DESCRIPTION

Figure 2:
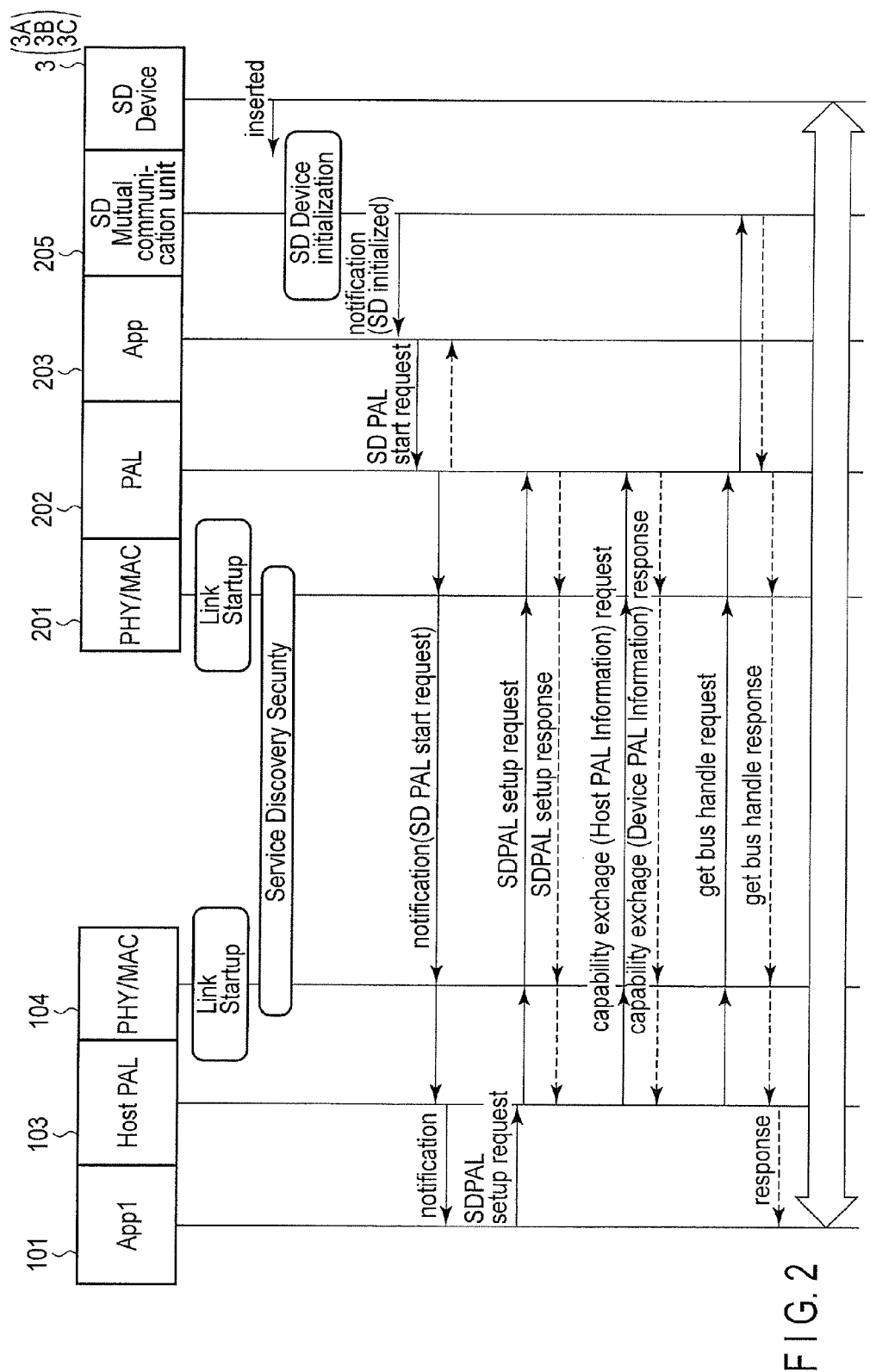
FIG. 2 is an exemplary diagram showing an example of a procedure of preparation for a session for starting transfer (delivery) of data between the electronic device to which an embodiment is applied, the memory apparatus, and another electronic device, according to an embodiment.

Various embodiments will be described hereinafter with reference to the accompanying drawings. In general, according to one embodiment, an electronic device comprising: a communication module configured to transfer data; a controller configured to transmit data, which is written into each of portable mediums connected to a second electronic device, to the second electronic device through the communication module, and configured to temporarily hold the data in a receiving buffer of the second electronic device; and a data controller configured to receive free space information of the receiving buffer of the second electronic device from the second electronic device through the communication module, and configured to prepare data, which is transmitted to each mobile medium from the communication module through the second electronic device, based on the received free space information.

Embodiments will now be described hereinafter in detail with reference to the accompanying drawings.

FIG. 1 shows an example of a mutual relationship between an electronic device to which the embodiment is applied, a portable device, and a second electrical device (an apparatus that enables recording or reading data between itself and the portable device (another electronic device which will be referred to as a device hereinafter)). It is to be noted that the portable device is a semiconductor memory that can be attached to the second electronic device or taken out from the second electronic device, e.g., a memory card (an SD card).

In the embodiment shown in FIG. 1, a host (the electronic device) 1 is, e.g., a personal computer (PC), and it reads and reproduces data (contents) held in each memory card (the portable device/memory apparatus) 3 through the device (the second electronic device) 2 or writes data into the memory card 3 through the device 2. The host 1 may be a television receiving side device (an information reproducing apparatus) or the like that is placed in a network such as a digital living network alliance (DLNA). The device 2 may be an HDD/DVD recorder (a recording and reproducing apparatus) or the like which is likewise present on the network.

It is to be noted that a method of acquiring or outputting contents is arbitrary and it may be spatial waves (electric waves), a cable (including an optical fiber) or an Internet protocol (IP) communication network. Further, the contents are also referred to as a stream, a program, or information, and they include video pictures, sound, music, and others. It is to be noted that the video pictures include moving pictures, still pictures, texts (information represented by characters or symbols shown as a code string subjected to coding), and arbitrary combinations thereof.

In FIG. 1, the device 2 and the host 1 transfer data based on wireless communication using, e.g., a wireless local area network (LAN) over IEEE 802.11b/a/n/ac/ad wireless technology (Wi-Fi or WiGig).

The device 2 includes a device-side PHY/MAC layer 201, a device-side SD protocol adaption layer (PAL) unit 202, a device-side SD application 203, an SD host controller driver 204, an SD mutual connection unit 205, an SD host controller 206, an SD card slot 207, and others. It is to be noted that the device-side SD PAL unit 202 is connected to a packet transmission/reception unit 211 and delivers (transfers) data between itself and a packet transmission/reception unit 111 of the later-described host 1 based on wireless communication, e.g., the wireless LAN or WiGig. Furthermore, the device-side SD PAL unit 202 includes at least a command header interpretation unit 222, a response interpretation unit 223, and a local command generation unit 224. Moreover, the SD host controller 206 is connected to a buffer memory 225.

The device-side PHY/MAC layer 201 has a physical (PHY) layer and a media access control (MAC) layer.

The above-described memory card (the memory apparatus) 3 is inserted into the SD card slot 207. It is to be noted that, if the SD card slots 7 are prepared, the memory card 3 is inserted into an arbitrary slot. Additionally, the memory cards 3 may be inserted into two or more or all slots. In this case, the memory cards may have the same specification or have different transfer rates (input/output rates or the like) or storage capacities. It is to be noted that, when the two or more memory cards 3 are provided and they must be individually identified, they will be referred to as (cards) 3A, 3B, 3C . . . hereinafter.

The SD host controller 206 writes data into the memory card 3 which is inserted into the SD card slot 207 or reads out data from the memory card 3.

The device-side SD application 203 is an application that accesses the memory card 3. The SD host controller driver 204 is software that controls the SD card host controller 206 and provides an abstracted interface to the device-side SD application 203.

The device-side SD PAL unit 202 converts a packet format that is exchanged between the SD card host controller 206 and the host 1. For example, when transmitting a packet to the host 1 from the SD card host controller 206, this packet is converted into a packet having a command format which is suitable for transmitting a command conforming to an SD card standard by high-speed wireless communication. Further, for example, when a command is received from the host 1, a packet suitable for transmission in the high-speed wireless communication is converted into the command format conforming to the SD card standard.

The SD mutual connection unit 205 has a function of switching access to the SD memory card 3 to access from the device-side SD application 203 and access from the SD application 101 of the host 1.

The host 1 has the host-side SD application 101, an SD card virtual controller 102, a host-side SD PAL unit (SD PAL) 103, a host-side PHY/MAC layer 104, and others.

The host-side PHY/MAC layer 104 has a physical (PHY) layer and a media access control (MAC) layer.

The SD card virtual controller 102 is a virtual controller that enables the host-side SD application 101 to access data in the memory card 3, and it converts into a command which is transmitted from the host-side SD application 101 to the host-side SD PAL unit 103.

The host-side SD PAL unit 103 and the device-side SD PAL unit 202 transmit or receive commands suitable for the wireless communication, e.g., the wireless LAN or WiGig through the packet transmission/reception unit 111 and the packet transmission/reception unit 211.

Furthermore, the host-side SD PAL unit 103 includes at least a command generation unit 112 and a response interpretation unit 115. Moreover, the SD card virtual controller 102 is connected to a buffer memory 125.

The host 1 and the device 2 transmit or receive packets suitable for the wireless communication, e.g., the wireless LAN or WiGig through the packet transmission/reception unit 111 and the packet transmission/reception unit 211.

In detail, as represented by an example in FIG. 2, a link for achieving the wireless communication is started up (Link Startup) between the host-side PHY/MAC layer 104 and the device-side PHY/MAC layer 201.

After the link startup, a communication service discovers both the layers, and the communication is secured as required (Service Discovery/Security).

If, the SD card slot 207 detects the SD memory card 3, the SD mutual connection unit 205 initializes a device-side SD Interface/UHS-II Interface 209 and a card SD Interface/UHS-II Interface 302 on the SD memory card 3 side to enable the communication with the SD memory card 3.

After the initialization, the SD mutual connection unit 205 notifies the device-side SD application 203 of termination of the initialization (notification (SD Initialized)).

The device-side SD application 203 requests the device-side SD PAL unit 202 to start SD PAL with respect to the SD card 3 (SD PAL start request).

The device-side SD PAL unit 202 requests the host-side SD PAL unit 103 to start SD PAL (notification (SD PAL start request)).

The host-side SD PAL unit 103 notifies the host-side SD application 101 that an SD PAL start request notification "notification (SD PAL start request)" has been received (notification).

The host-side SD application 101 transmits an SD PAL start request (SD PAL start request) to the device-side SD PAL unit 202 and requests SD PAL setup.

The device-side SD PAL unit 202 responds with "SDPAL setup response" in the host-side SD PAL unit 103 with respect to the request of the SD PAL setup.

The host-side SD PAL unit 103 transmits to the device-side SD PAL unit 202 a "capability exchange (HOST PAL Information) request" that requests transmission of a capability of the host 1 and transmission of a capability of the device 2 together with information such as a buffer size (a capacity of the buffer memory 125) which is a capability of the host 1 side.

In response to reception of a "capability exchange request", the device-side SD PAL unit 201 transmits to the host-side SD PAL unit 103 a "capability exchange response" indicative of capabilities of the SD memory card 3 and a buffer size which is a capability of a corresponding standard (a capacity of the buffer memory 225).

To request an access right with respect to the memory card (the SD device) 3 that can be accessed by the device-side SD IF/UHS-II IF 209, the host-side SD PAL unit 103 transmits a "get bus handle request" to the device-side SD PAL unit 202.

The device-side SD PAL unit 202 receives the "get bus handle request" and inquires at the SD mutual connection unit 205 as to whether the access right to the SD card by the host 1 host 1 can be acquired.

If, permitting the access right, the SD mutual connection unit 205 responds to the device-side SD PAL unit 202 that the access right is permitted.

The device-side SD PAL unit 2021 transmits a "get buts handle response" to the host-side SD PAL unit 103.

The host-side SD PAL unit 103 notifies the host-side SD application 101 that a bus handle has been acquired.

It is to be noted that a program held by the SD application 101 which is operated on the host 1 generates a command for controlling the memory card 3 in the command generation unit 112 in the case of controlling the memory card 3.

If, the memory card as a control target is present in a remote environment, a command generated by the command generation unit 112 is converted into a remote command in accordance with a command generated by a remote command generation unit 113. At this time, a command type and a response type are added as header information.

The converted remote command is transmitted to the device 2 by the packet transmission/reception unit 111.

The device 2 receives the remote command from the host 1 by using the packet transmission/reception unit 211 and transfers it to the command header interpretation unit 222.

The command header interpretation unit 222 interprets the header information, i.e., the command type and the response type of this remote command received by the packet transmission/reception unit 211.

The command header interpretation unit 222 transfers the command type interpreted from the remote command header and a remote command main body to the local command generation unit 224 and transfers the response type interpreted from the remote command header to the response interpretation unit 223, respectively.

The local command generation unit 224 generates a command group, which is used for controlling the portable device 3, from the command type and the remote command main body received from the command header interpretation unit 222.

The local command generation unit 224 issues a group of the generated commands to the memory card 3 through the host controller 225 in accordance with a procedure associated with a system specified in the command type received from the command header interpretation unit 222.

A result of execution in the memory card 3 is returned to the host controller 225 and confirmed by the response interpretation unit 223. That is, when the result is an expected response data format corresponding to the response type received from the command header interpretation unit 22, e.g., one of (1) command execution without data,
(2) data-out command execution, and
(3) data-in command execution,
the response interpretation unit 223 transmits this result to the packet transmission/reception unit 211. Consequently, this result is transferred to the host 1.

The host 1 acquires response data from the command received by the packet transmission/reception unit 111 and interprets a response in the response interpretation unit 115, and a program held in the SD application 101 is informed of an execution result.

Figure 3:
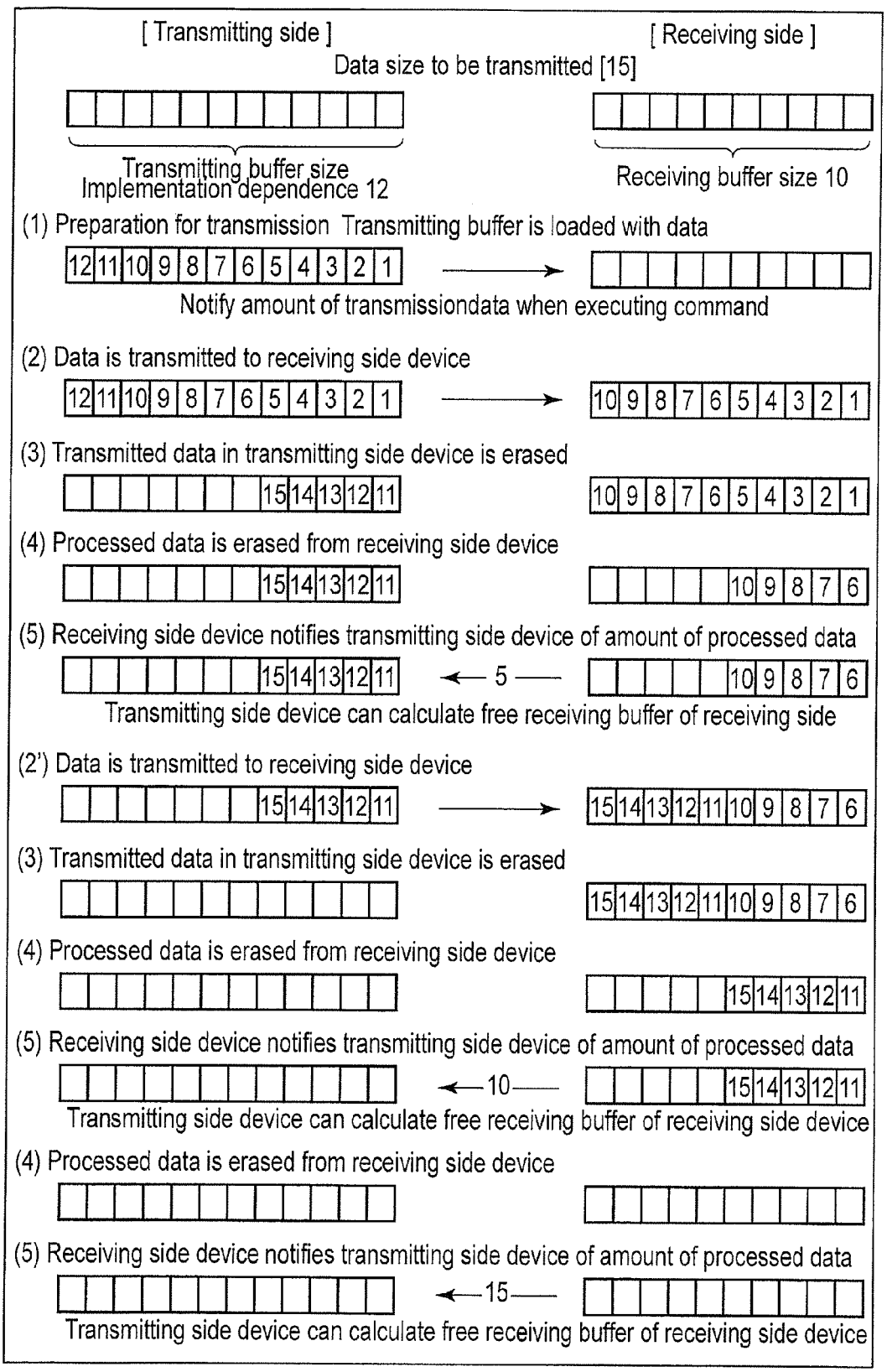
FIG. 3 is an exemplary diagram showing an example of data transfer between a transmitting side device and a receiving side device in the electronic device to which the embodiment is applied, the memory apparatus, and another electronic device, according to an embodiment.

FIG. 3 shows an example of transferring data from the electronic device to the memory card in the electronic device (the PC/the host), the memory card (the storage medium/the SD card), and the device (the second electronic device/the recorder).

Although already explained with reference to FIG. 1 and FIG. 2, the host 1 issues various commands to the memory card (the SD card), receives responses, and transmits/receives data (contents). The device 2 issues commands received from the host 1 to the connected memory card. That is, the commands, the responses, and the data transmitted or received between the memory card 3 and the host 1 through the device 2.

It is to be noted that the host 1 and the device 2 notify each other of a size of each packet reception buffer (the buffer memory) in the capability exchange phase.

If, writing data into the SD card 3, the host 1 serves as a transmitting side device, and the device 2 serves as a receiving side device. If, reading data from the SD card 3, the device 2 serves as a transmitting side device, and the host 1 serves as a receiving side device.

It is to be noted that, in both situations, the host 1 transmits commands, and the device 2 transmits responses.

FIG. 3 shows an example of transmitting data from the host to the memory card (the device).

In FIG. 3, the transmitting side device (the host 1) calculates a free space in the buffer memory of the receiving side device (the device 2) (based on DATA-ACK from the receiving side device described below) and transmits the data.

The data transmitting side device (the host 1) acquires a transmittable/receivable data size in a transaction (a unit of single processing between the terminal (the memory card) and the host) in the above-described command transmission/reception (the capability exchange phase). It is to be noted that, when the transmitting side device (the host 1) has succeeded in transmission of the data, the successfully transmitted data can be deleted from the buffer memory (the transmission buffer).

If, the receiving side device (the device 2) has received the data and appropriately processed it, for example, if, it can be checked that data has been successfully stored in the memory card 3, DATA-ACK which informs (the transmitting side device) of completion of the data reception (completion of the processing) is transmitted to the transmitting side device together with a size of the data, which has been processed in the transaction, from the top thereof. Therefore, the transmitting side device can confirm (grasp) an amount of data retained (a retained amount) in the buffer memory of the receiving side device (a receiving buffer) and transmit subsequent data for an amount corresponding to a free space in the receiving buffer.

In detail, processing are issued by:
loading buffer with data as preparation for transmission . . . (1);
transmitting the data to the receiving side device . . . (2);
erasing the transmitted data in the transmitting side device . . . (3);
erasing the processed data from the receiving side device . . . (4);
notifying the transmitting side device of an amount of processed data from the receiving side device . . . (5);
transmitting the data to the free space in the buffer of the receiving side device from the transmitting side device . . . (2');
erasing the transmitted data in the transmitting side device . . . (3);
erasing the processed data from the receiving side device . . . (4); and
notifying the transmitting side device of an amount of processed data from the receiving side device . . . (5), and
repeating (2') to (5) until all data (of the transmitting side device) as a transmission target is transmitted.

It is to be noted that, when the receiving side device notifies the transmitting side device of an amount of transmitted data in (5), the transmitting side device can compute (calculate) a free space in the receiving buffer.

Moreover, whereas (2) corresponds to transmitting the data to the empty receiving buffer, (2') identifies that the data in a free space (a capacity) generated in the receiving buffer is transmitted, and these steps have substantially the same operations.

It is to be noted that a free space in the receiving buffer (a space in the receiving buffer) is estimated based on the following expression:

a free space in the receiving buffer=a receiving buffer size−a retained amount in the receiving buffer.

Additionally, the retained amount in the receiving buffer can be calculated based on the following expression:

the retained amount in the receiving buffer=a total amount of transmitted data−an amount of processed data.

Figure 4B:
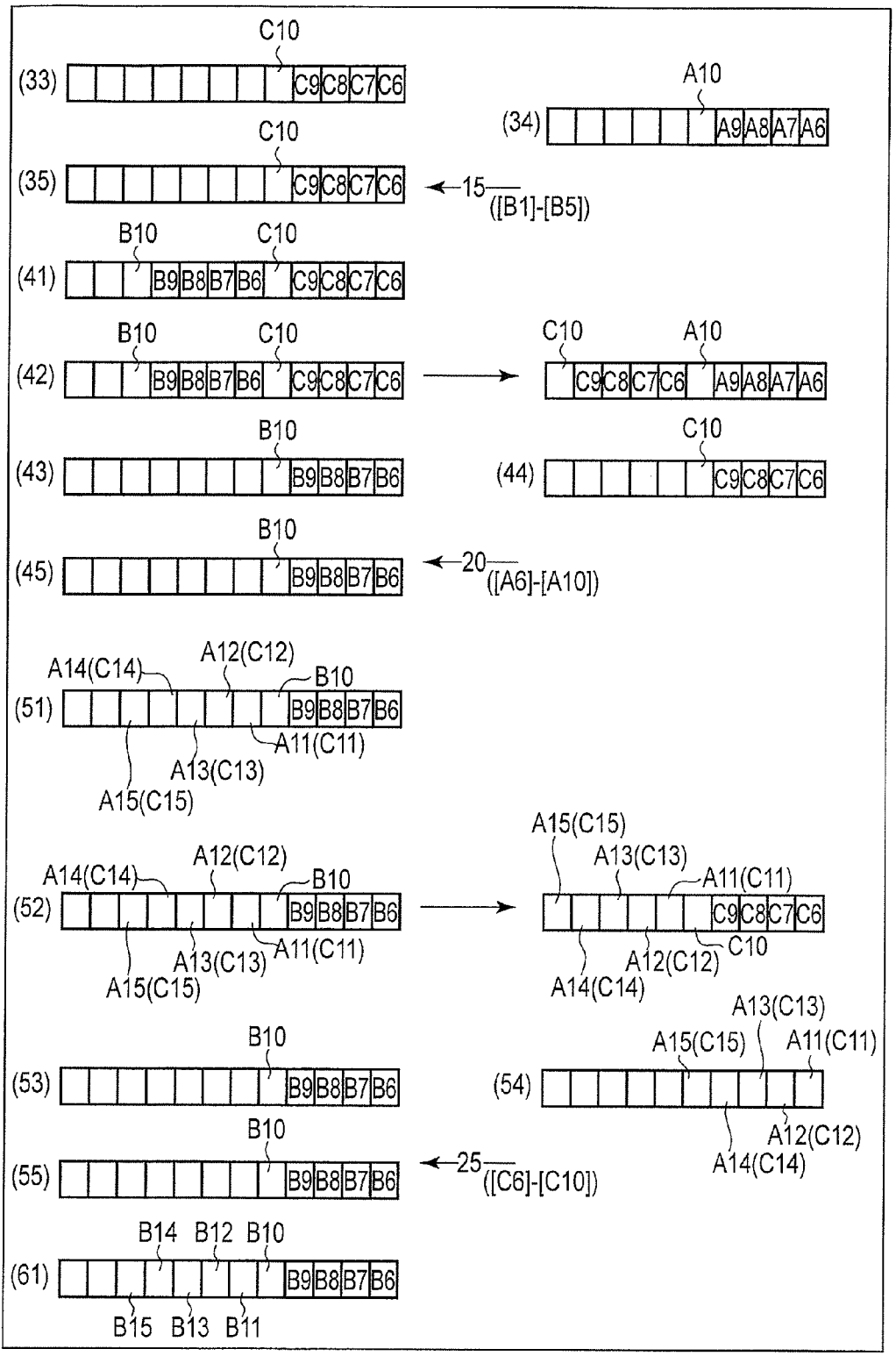
FIG. 4B is an exemplary diagram showing an example of data transfer between the transmitting side device and the receiving side device in the electronic device to which the embodiment is applied, the memory apparatus, and the other electronic device, according to an embodiment.

FIGS. 4A, 4B and 4C show an example of a data transmission method when a plurality of (three) memory cards are connected to the device.

First, as preparation for transmission, the transmitting buffer is loaded with data, where since the plurality of (3) memory cards are provided, it is assumed that the transmitting buffer can equally transmit the data to the respective memory cards, and [A1] to [A5], [B1] to [B5], and [C1] to [C5] are prepared . . . (11);

the data is transmitted to the receiving side device, where it is assumed that [C3] to [C5] remain without being stored in the transmitting buffer . . . (12);

the transmitted data in the transmitting side device is erased, wherein [A1] to [A5] and [B1] to [B5] are erased . . . (13);

the processed data is erased from the receiving side device, where [A1] to [A5] are erased . . . (14); and the receiving side device notifies the transmitting side device of the amount of processed data, where a free space is [5] and the transmitting side device is notified that the processed data is [A1] to [A5] . . . (15).

Subsequently, the data is transmitted from the transmitting side device to the free space in the buffer of the receiving side device, where [C1] to [C5] remaining in the transmitting buffer are transmitted . . . (21);

the transmitted data in the transmitting side device is erased, where [C1] to [C5] are erased . . . (22);

the processed data is erased from the receiving side device, where it is assumed that [B1] to [B5] are not erased but [C1] to [C5] are erased . . . (23); and the receiving side device notifies the transmitting side device of an amount of processed data, where a free space is [5] and the transmitting side device is notified that the processed data is [C1] to [C5] . . . (24).

Further, the transmitting buffer is loaded with data for subsequent transmission, where, in response to the notification that [B1] to [B5] remain in the receiving buffer, [A6] to [A10] and [C6] to [C10] are prepared . . . (31);

the data is transmitted from the transmitting side device to the free space in the buffer of the receiving side device, wherein [A6] to [A10] are transmitted . . . (32);

the transmitted data in the transmitting side device is erased, where [A6] to [A10] are erased . . . (33);

the processed data is erased from the receiving side device, where it is assumed that [B1] to [B5] are erased . . . (34); and the receiving side device notifies the transmitting side device of an amount of processed data, where a free space is [5] and the transmitting side device is notified that the processed data is [B1] to [B5] ([A6] to [A10] remain in the receiving buffer) . . . (35).

Subsequently, the transmitting buffer is loaded with data for subsequent transmission, wherein, in response to the notification that [A6] to [A10] remain in the receiving buffer, [B6] to [B10] are prepared after [C6] to [C10] . . . (41);

the data is transmitted from the transmitting side device to a free space in the buffer of the receiving side device, where [C6] to [C10] are transmitted . . . (42);

the transmitted data in the transmitting side device is erased, where [C6] to [C10] are erased . . . (43);

the processed data is erased from the receiving side device, where it is assumed that [A6] to [A10] are erased . . . (44); and the receiving side device notifies the transmitting side device of an amount of processed data, wherein a free space is [5] and the transmitting side device is notified that the processed data is [A6] to [A10] ([C6] to [C10] remain in the receiving buffer) . . . (45).

Further, the transmitting buffer is loaded with data for subsequent transmission, where, in response to the notification that [C6] to [C10] remain in the receiving buffer, data, which should be transmitted to a card having a higher capability (a higher processing speed) in the memory cards, in [A11] to [A15] or [C11] to [C15] is prepared to follow [B6] to [B10] . . . (51);

the data is transmitted from the transmitting side device to a free space in the buffer of the receiving side device, where either [A11] to [A15] or [C11] to [C15] prepared at (51) are transmitted . . . (52);

the transmitted data in the transmitting side device is erased, where either [A11] to [A15] or [C11] to [C15] prepared at (51) are erased . . . (53);

the processed data is erased from the receiving side device, where it is assumed that [C6] to [C10] are erased . . . (54); and the receiving side device notifies the transmitting side device of an amount of processed data, where a free space is [5] and the transmitting side device is notified that the processed data is [C6] to [C10] (either [A11] to [A15] or [C11] to [C15] remain in the receiving buffer) . . . (55).

Then, the transmitting buffer is loaded with data for subsequent transmission, where it is assumed that, for example, [B11] to [B15] which should be transmitted to the memory card having the small number of pieces of transmitted data are actively transmitted, and [B11] to [B15] are prepared as data that should be transmitted . . . (61);

thereafter, [B6] to [B10] preceding [B11] to [B15] prepared at (61) are transmitted to a free space in the buffer of the transmitting side device . . . (62);

the transmitted data is erased in the transmitting side device . . . (63);

the processed data is erased in the receiving side device . . . (64); and the receiving side device notifies the transmitting side device of an amount of processed data . . . (65).

Here, in place of the data [B11] to [B15] described in (61), [C11] to [C15] or [A11] to [A15] that follow either [A11] to [A15] or [C11] to [C15] transmitted at (51) may be prepared, and they can be transmitted prior to [B11] to [B15].

It is to be noted that, at (13), (15), (24), (35), (45), or (55), when the transmitting side device is informed by the receiving side device of the amount of processed data which should be stored in each memory card, the transmitting side device can compute (calculate) the free space in the receiving buffer. At this time, the free space in the receiving buffer, i.e., an amount of free space in the receiving buffer is a sum total of amounts of free spaces in the receiving buffers obtained in accordance with each memory card.

That is, the amount of free space in the receiving buffer can be obtained based on the following expressions:

a retained amount in the receiving buffer=an amount of transmitted data−an amount of processed data; and an amount of free space in the receiving buffer=a receiving buffer size−Σa retained amount in the receiving buffer (per device)

<<a sum total of retained amounts in the receiving buffers (per device)>>.

Therefore, based on the retained amounts of data in a transaction for all the memory cards connected to the device, an amount of free space in the receiving buffer can be estimated. That is, a retained amount in the receiving buffer per memory card is calculated, and obtaining a sum total of such amounts enables estimating an amount of free space in the data buffer when the memory cards are connected to the device.

Then, in the device 2 (the receiving side device), received data is processed for a subsequent process (recorded in a memory region of the memory card), and a timing for returning to the host 1 (the transmitting side device) DATA-ACK indicating that the data is deleted from the receiving buffer is devised.

Usually, data in an MAC layer in the wireless communication is a packet of 2 to 8 kilobytes (KB), and data to be transmitted or received is divided into packets.

A size of data held in the memory card often exceeds, e.g., several megabytes (MB), and one piece of data may be divided into 1,000 packets or more. In most cases, DATA-ACK is transmitted every time one packet is processed. However, DATA-ACK can be collectively transmitted to some extent, and an amount of data to be transmitted is smaller than that when one packet is received and data is transmitted each time. Therefore, it is efficient to devise the timing for transmitting DATA-ACK and collectively transmitting the data to some extent within an allowable time.

It is to be noted that even DATA-ACK constitutes communication (traffic) between the transmitting side device and the receiving side device, and hence the less times DATA-ACK appears, the higher the transfer rate of data itself will be.

It is to be noted, as one of timings for transmitting DATA-ACK (returning DATA-ACK), a time point immediately before time-out occurs on the transmitting side device side in each transaction is preferable. Data is returned.

Furthermore, the transmitting side device can estimate an amount of data processing per unit time of the device on the receiving side device side from the timing for receiving DATA-ACK and an amount of processed data written in DATA-ACK.

That is, at the time of reading or writing with respect to a specific memory card, for example, amounts of processed data written in DATA-ACK received within the past 1 minute are added up, then the added amount is divided by 60, and a result is a throughput of the memory card per second.

As described above, assuming that the transmitting side device (the host 1) can estimate the data processing amount in the receiving side device (the device 2), the transmitting side device seeks to transmit data based on this data processing amount (at the time of transmitting data, the obtained data processing amount is maintained).

It is to be noted that, since the data processing amount usually differs according to each memory card, an amount of data that is transmitted per unit time in each transaction differs when transmitting the data via a transmission path.

Therefore, the transmitting side device multiplexes data based on a rate of data transmission for each transaction and transmits the data from the MAC layer. The amount of data transmitted at this moment is restricted to an amount of data which is estimated to correspond to a free space in received data (falls within the range of a free space in the receiving buffer).

It is to be noted that, since each of all packets has a header portion (a management information holding portion) including management information such as a bus ID, a device ID, a sequence No., and others attached thereto, the individual packets do not have to be continuous in accordance with each memory card, and they can be transmitted in an arbitrary order. Furthermore, received packets are sorted in accordance with each memory card and rearranged (sequenced) based on the sequence Nos.

As a result, the receiving side device can consume a fixed amount of data (processing at a subsequent step), and the transmitting side device can stably transmit a fixed amount of data.

Moreover, even if a data transfer rate of the transfer path is changed, periodically estimating the data throughput enables periodically updating the allocation to an appropriate value.

As described above, the embodiment has the effect of coping with the situation where the memory cards are connected to one device and these memory cards are simultaneously accessed. Additionally, when a data rate is adjusted on the transmitting side device side (the host) and then data is transmitted in accordance with characteristics (input/output rates and others) of the each connected memory card, data can be transmitted to each connected memory card at an optimum rate.

Further, on the side where data is read from the memory card, the data can be transmitted at an optimum rate in accordance with a rate of data consumption (transfer to a subsequent step) on the receiving side device side.

That is, a retained amount in the receiving buffer per memory card is calculated, and a free space in the data buffer when the memory cards are connected to the device (another electronic device) is estimated by totaling the respective retained amounts, whereby data can be transmitted to each connected memory card at an optimum rate. It is to be noted that, when a data throughput on the receiving side device side is estimated based on the received DATA-ACK, an amount of data that can be processed by the receiving side device can be stably transmitted.

Furthermore, when DATA-ACK transmitted from the receiving side device to the transmitting side device is transmitted immediately before time-out occurs in the receiving side device, unnecessary DATA-ACK is not transmitted, which increases the efficiency of wireless resources.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An electronic apparatus comprising:
a communication module to transfer data;
a controller to transmit data, which is written into each of portable mediums connected to a second electronic device comprising a receiving buffer, to the second electronic device through the communication module; and a data controller to receive information indicating (i) an amount of data erased from the receiving buffer by the second electronic device and (ii) a portable medium corresponding to the erased data of the portable mediums from the second electronic device through the communication module, and to determine data, which is transmitted to the second electronic device, based on the received information, wherein the number of times the data controller receives the information from the second electronic device is less than the number of times of transmitting the data which is transmitted to one of the portable mediums, some pieces of the received information being collectively transmitted.

2. The apparatus of claim 1, wherein the data controller sets an amount or a transmission order of data which is transmitted to each of the portable mediums based on respective characteristics of the portable mediums.

3. The apparatus of claim 2, wherein the data controller determines data which is to be transmitted next to one of the portable mediums based on the information from the second electronic device.

4. The apparatus of claim 1, wherein the data controller determines data which is to be transmitted next to one of the portable mediums based on the information from the second electronic device.

5. An electronic apparatus in communication with an electronic device that includes a receiving buffer, the electronic apparatus comprising:

a packet transmission and reception unit;

a protocol adaption layer (PAL) unit in communication with the packet transmission reception unit, the PAL unit to, transmit, through the packet transmission and reception unit, data to the receiving buffer of the electronic device, receive, through the packet transmission and reception unit, information indicating (i) an amount of data erased from the receiving buffer and (ii) a memory card corresponding to the erased data of one or more memory cards connected to the electronic device, and determine data to be transmitted to the electronic device through the packet transmission and reception unit based on the received information, wherein the number of times the packet transmission and reception unit receives the information from the electronic device is less than the number of times of transmitting the data which is transmitted to the electronic device, wherein one or more pieces of the received information are transmitted at one time.

6. The apparatus of claim 5, wherein the PAL unit sets an amount or a transmission order of data which is transmitted to each of the memory cards connected to the electronic device based on respective characteristics of the memory cards.

7. The apparatus of claim 6, wherein the PAL unit determines data which is to be transmitted next to one of the memory cards connected to the electronic device based on the information from the electronic device.

8. The apparatus of claim 5, wherein the PAL unit determines data which is to be transmitted next to one of the memory cards connected to the electronic device based on the information from the electronic device.

* * * * *